US011198642B2

(12) United States Patent
Kashima et al.

(10) Patent No.: US 11,198,642 B2
(45) Date of Patent: Dec. 14, 2021

(54) PRODUCTION METHOD OF CHEMICALLY STRENGTHENED GLASS, AND CHEMICALLY STRENGTHENED GLASS

(71) Applicant: AGC INC., Chiyoda-ku (JP)

(72) Inventors: Izuru Kashima, Tokyo (JP); Kaname Sekiya, Tokyo (JP); Akio Shizukai, Tokyo (JP); Yositeru Ikeda, Tokyo (JP); Shogo Sueda, Tokyo (JP)

(73) Assignee: AGC INC., Chiyoda-ku (JP)

( * ) Notice: Subject to any disclaimer, the term of this patent is extended or adjusted under 35 U.S.C. 154(b) by 275 days.

(21) Appl. No.: 16/251,963

(22) Filed: Jan. 18, 2019

(65) Prior Publication Data

US 2019/0225537 A1 Jul. 25, 2019

(30) Foreign Application Priority Data

Jan. 19, 2018 (JP) ............................ JP2018-007380

(51) Int. Cl.

*C03C 21/00* (2006.01)
*C03C 3/087* (2006.01)
*C03C 3/093* (2006.01)
*C03C 3/095* (2006.01)
*C03C 3/097* (2006.01)

(52) U.S. Cl.

CPC ............ *C03C 21/002* (2013.01); *C03C 3/087* (2013.01); *C03C 3/093* (2013.01); *C03C 3/095* (2013.01); *C03C 3/097* (2013.01)

(58) Field of Classification Search

CPC .............................. C03C 21/002; C03C 3/087
USPC ........................................................ 428/410
See application file for complete search history.

(56) References Cited

U.S. PATENT DOCUMENTS

| | | | | |
|---|---|---|---|---|
| 9,487,434 | B2 * | 11/2016 | Amin | C03C 21/002 |
| 2010/0009154 | A1 | 1/2010 | Allan et al. | |
| 2017/0273201 | A1 | 9/2017 | Eckart | |
| 2017/0295657 | A1 * | 10/2017 | Gross | H05K 5/0217 |
| 2017/0355640 | A1 * | 12/2017 | Oram | C03C 3/097 |
| 2018/0105461 | A1 * | 4/2018 | Schneider | C03C 21/005 |

FOREIGN PATENT DOCUMENTS

JP 2011-527661 11/2011

* cited by examiner

*Primary Examiner* — Lauren R Colgan
(74) *Attorney, Agent, or Firm* — Oblon, McClelland, Maier & Neustadt, L.L.P.

(57) ABSTRACT

The present invention relates to a method for producing a chemically strengthened glass, the method including, performing a chemical strengthening treatment including the following steps (1) to (3) to a glass having a specific composition, (1) a step of bringing the glass into contact with an inorganic salt composition including 70 mass % or more of potassium nitrate to perform ion exchange; (2) a step of bringing the glass having been ion-exchanged in step (1) into contact with an inorganic salt composition including 50 mass % or more of sodium nitrate to perform ion exchange; and (3) a step of bringing the glass having been ion-exchanged in step (2) into contact with an inorganic salt composition including 70 mass % or more of potassium nitrate to perform ion exchange.

2 Claims, No Drawings

PRODUCTION METHOD OF CHEMICALLY STRENGTHENED GLASS, AND CHEMICALLY STRENGTHENED GLASS

FIELD OF THE INVENTION

The present invention relates to a production method of a chemically strengthened glass, and a chemically strengthened glass.

BACKGROUND OF THE INVENTION

A chemically strengthened glass having a compressive stress layer formed on a glass surface by ion exchange, etc. has been conventionally used as a cover glass for a display of various information terminal devices, etc., because it is thin and nevertheless has resistance to cracking, etc.

For example, an aluminosilicate glass is subjected to a chemical strengthening treatment of replacing Na ion contained in the glass with K ion having a larger ionic radius than that of Na ion, and consequently forming a compressive stress layer on a glass surface, and strengthening of the glass can thereby be realized.

It is required for the chemically strengthened glass to be more improved in strength, and efforts are being made to provide a chemical strengthening treatment method for improving the strength by enhancing the compressive stress value (CS) of the compressive stress layer and increasing the depth of compressive stress layer (DOL).

For example, Patent Document 1 discloses a glass that is chemically strengthened by continuous immersion in a plurality of ion-exchange baths. Specifically, a depth profile of $K_2O$ concentration in a chemically strengthened glass obtained by conducting single, double and triple ion exchange for an aluminosilicate glass is disclosed (Patent Document 1, FIG. 3)

In addition, Patent Document 2 discloses a method of performing so-called two-step strengthening where a glass containing both $Li_2O$ and $Na_2O$ each at a predetermined concentration or more, is put into contact with an ion-exchange solution containing a predetermined concentration of sodium nitrate ($NaNO_3$) to perform ion exchange, and then put into contact with an ion-exchange solution containing a predetermined concentration of potassium nitrate ($KNO_3$) to perform ion exchange.

Patent Document 1: JP-T-2011-527661

Patent Document 2: US 2017/273201

SUMMARY OF THE INVENTION

In the profile of the chemically strengthened glass disclosed in Patent Document 1 obtained by triple ion exchange of an aluminosilicate glass, the concentration profile of $K_2O$ reveals a plurality of inflection points therein, but the strength as a chemically strengthened glass is insufficient. In addition, the strength of a chemically strengthened glass obtained by the method of performing two-step strengthening disclosed in Patent Document 2 is also insufficient.

Accordingly, an object of the present invention is to provide a production method of a chemically strengthened glass having excellent strength compared with a conventional one, and a chemically strengthened glass produced by the production method.

Means for Solving the Problems

The present invention can realize a chemically strengthened glass having higher strength than conventional ones, by a method of bringing a glass having a specific composition into contact with, sequentially, an inorganic salt composition containing potassium nitrate at a specific amount or more, an inorganic salt composition containing sodium nitrate at a specific amount or more, and an inorganic salt composition containing potassium nitrate at a specific amount or more, to perform ion exchange.

More Specifically, the Present Invention is as Follows.

1. A method for producing a chemically strengthened glass, the method including, performing a chemical strengthening treatment including the steps (1) to (3) shown below to a glass, the glass including, in mole percentage based on oxides, from 50 to 80% of $SiO_2$, from 2 to 25% of $Al_2O_3$, from 0.1 to 20% of $Li_2O$, from 0.1 to 18% of $Na_2O$, from 0 to 10% of $K_2O$, from 0 to 15% of MgO, from 0 to 5% of CaO, from 0 to 5% of $P_2O_5$, from 0 to 6% of $B_2O_3$, from 0 to 5% of $Y_2O_3$, and from 0 to 5% of $ZrO_2$:

(1) a step of bringing the glass into contact with an inorganic salt composition including 70 mass % or more of potassium nitrate to perform ion exchange;

(2) a step of bringing the glass having been ion-exchanged in step (1) into contact with an inorganic salt composition including 50 mass % or more of sodium nitrate to perform ion exchange; and (3) a step of bringing the glass having been ion-exchanged in step (2) into contact with an inorganic salt composition including 70 mass % or more of potassium nitrate to perform ion exchange.

2. The method for producing a chemically strengthened glass according to 1 above, satisfying at least one of the following (a1) to (a3):

(a1) in step (1), the contact between the glass and the inorganic salt composition is performed at 350 to 480° C. for 0.5 to 20 hours;

(a2) in step (2), the contact between the glass and the inorganic salt composition is performed at 340 to 480° C. for 0.5 to 20 hours; and (a3) in step (3), the contact between the glass and the inorganic salt composition is performed at 350 to 480° C. for 0.5 to 20 hours.

3. The method for producing a chemically strengthened glass according to 1 or 2 above, satisfying at least one of the following (b1) to (b3):

(b1) the inorganic salt composition in step (1) is an inorganic salt composition including 80 mass % or more of potassium nitrate;

(b2) the inorganic salt composition in step (2) is an inorganic salt composition including 65 mass % or more of sodium nitrate; and (b3) the inorganic salt composition in step (3) is an inorganic salt composition including 80 mass % or more of potassium nitrate.

4. The method for producing a chemically strengthened glass according to any one of 1 to 3 above, satisfying at least one of the following (c1) to (c3):

(c1) in step (1), the contact between the glass and the inorganic salt composition is performed at 360 to 470° C.;

(c2) in step (2), the contact between the glass and the inorganic salt composition is performed at 350 to 470° C.; and (c3) in step (3), the contact between the glass and the inorganic salt composition is performed at 360 to 470° C.

5. The method for producing a chemically strengthened glass according to any one of 1 to 4 above, satisfying at least one of the following (d1) to (d3):

(d1) in step (1), the contact between the glass and the inorganic salt composition is performed for 0.5 to 15 hours;

(d2) in step (2), the contact between the glass and the inorganic salt composition is performed for 1 to 15 hours; and (d3) in step (3), the contact between the glass and the inorganic salt composition is performed for 0.5 to 15 hours.

6. The method for producing a chemically strengthened glass according to any one of 1 to 5 above, in which:
   Na ion is ion-exchanged with K ion in step (1);
   Li ion is ion-exchanged with Na ion in step (2); and
   Na ion is ion-exchanged with K ion in step (3).

7. A chemically strengthened glass including, in mole percentage based on oxides, from 50 to 80% of $SiO_2$, from 2 to 25% of $Al_2O_3$, from 0.1 to 20% of $Li_2O$, from 0.1 to 18% of $Na_2O$, from 0 to 10% of $K_2O$, from 0 to 15% of MgO, from 0 to 5% of CaO, from 0 to 5% of $P_2O_5$, from 0 to 6% of $B_2O_3$, from 0 to 5% of $Y_2O_3$, and from 0 to 5% of $ZrO_2$, in which, the glass has a compressive stress value at a depth of 20 [μm] from a surface of the glass of 160×t+12 [MPa] or more, and a compressive stress value at a depth of 40 [μm] from the surface of the glass of 167×t−21 [MPa] or more, in which t is a thickness [mm] of the glass.

8. A chemically strengthened glass, including, in mole percentage based on oxides, from 50 to 80% of $SiO_2$, from 2 to 25% of $Al_2O_3$, from 0.1 to 20% of $Li_2O$, from 0.1 to 18% of $Na_2O$, from 0 to 10% of $K_2O$, from 0 to 15% of MgO, from 0 to 5% of CaO, from 0 to 5% of $P_2O_5$, from 0 to 6% of $B_2O_3$, from 0 to 5% of $Y_2O_3$, and from 0 to 5% of $ZrO_2$, in which, the glass has an average value of a compressive stress at a depth of 20 to 40 [μm] from a surface of the glass of 164×t-5 [MPa] or more, in which t is a thickness [mm] of the glass.

9. The chemically strengthened glass according to 7 or 8 above, having a depth of a compressive stress layer of 60 μm or more.

In the method for producing a chemically strengthened glass of the present invention, a glass having a specific composition is used as the glass for chemical strengthening and ion exchange is performed by bringing the glass for chemical strengthening into contact with, sequentially, an inorganic salt composition containing potassium nitrate at a specific amount or more, an inorganic salt composition containing sodium nitrate at a specific amount or more, and an inorganic salt composition containing potassium nitrate at a specific amount or more to perform ion exchange. According to this method, a high compressive stress compared with conventional ones can be realized in a region where the depth from the surface is relatively shallow, and a chemically strengthened glass having excellent strength can be produced.

DETAILED DESCRIPTION OF THE INVENTION

The present invention is described in detail below, but the present invention is not limited to the following embodiments and can be implemented by making any modifications within the scope not departing from the gist of the present invention.

In the present description, the term "from . . . to . . . " showing the numerical range includes the numerical values indicated before and after the "to" as the lower limit and the upper limit. Furthermore, in the present description, unless otherwise indicated, the composition (contents of respective components) of the glass is described using a content expressed in mole percentage based on oxides.

The method for producing a chemically strengthened glass according to one embodiment of the present invention (hereinafter, sometimes simply referred to as the present production method) is described below.

[Glass for Chemical Strengthening]

The glass for chemical strengthening to be chemically strengthened in the present production method contains, in mole percentage based on oxides, from 50 to 80% of $SiO_2$, from 2 to 25% of $Al_2O_3$, from 0.1 to 20% of $Li_2O$, from 0.1 to 18% of $Na_2O$, from 0 to 10% of $K_2O$, from 0 to 15% of MgO, from 0 to 5% of CaO, from 0 to 5% of $P_2O_5$, from 0 to 6% of $B_2O_3$, from 0 to 5% of $Y_2O_3$, and from 0 to 5% of $ZrO_2$.

$SiO_2$ is a main component constituting the glass. In addition, $SiO_2$ is a component reducing the occurrence of cracking when a scratch (indentation) is formed on the glass surface, or decreasing the fracture rate when an indentation is formed after chemical strengthening. Furthermore, $SiO_2$ is a component enhancing the acid resistance of the glass and decreasing the sludge amount at the time of etching treatment (hydrofluoric acid resistance).

In order to maintain the stability and weathering resistance of the glass, the content of $SiO_2$ is 50% or more, and preferably, in a stepwise manner, 54% or more, 58% or more, 60% or more, 63% or more, 66% or more, or 68% or more. Furthermore, in order to increase the meltability of the glass and thereby enhancing the productivity, the content of $SiO_2$ is 80% or less and is preferably 78% or less, more preferably 76% or less, still more preferably 74% or less, and most preferably 72% or less.

For the reason that CS during the chemical strengthening treatment can be higher as the content of $Al_2O_3$ is larger, the content of $Al_2O_3$ is 2% or more, and preferably, in a stepwise manner, 3% or more, 5% or more, 7% or more, 8% or more, 9% or more, 10% or more, 11% or more, 12% or more, or 13% or more. On the other hand, in order to enhance the acid resistance of the glass and enhance the formability by lowering the devitrification temperature, the content of $Al_2O_3$ is 25% or less and is preferably 20% or less, more preferably 18% or less, still more preferably 15% or less, particularly preferably 13% or less.

$Li_2O$ is a component forming a surface compressive stress by ion exchange. The content of $Li_2O$ is 0.1% or more, preferably 3% or more, more preferably 4% or more, still more preferably 5% or more, particularly preferably 6% or more, and typically 7% or more. On the other hand, if the content of $Li_2O$ exceeds 20%, the acid resistance of the glass may deteriorate. The content of $Li_2O$ is 20% or less. In this case, the content of $Li_2O$ is preferably 10% or less, more preferably 9.5% or less, still more preferably 9% or less, particularly preferably 8.5% or less, and most preferably 8% or less.

$Na_2O$ is a component forming a surface compressive stress layer by ion exchange and enhancing the meltability of the glass. The content of $Na_2O$ is 0.1% or more and is preferably 1% or more. The content of $Na_2O$ is more preferably 2% or more, still more preferably 3% or more. On the other hand, if the content of $Na_2O$ exceeds 18%, the surface compressive stress formed by ion exchange may be reduced. The content of $Na_2O$ is 18% or less, preferably 17.5% or less, more preferably 17% or less, still more preferably 16.5% or less, particularly preferably 16% or less.

$K_2O$ is a component increasing the ion exchange rate, making the compressive stress layer deeper, providing an effect of lowering the melting temperature of the glass, and increasing nonbridging oxygen. In addition, $K_2O$ makes it possible to avoid an increase of change in the surface compressive stress due to $NaNO_3$ concentration in a molten salt of potassium nitrate used at the time of chemical strengthening treatment. Furthermore, a small amount of $K_2O$ has an effect of suppressing the amount of tin intruded from the bottom surface during molding by a float process and therefore, at the time of molding by a float process, $K_2O$ is preferably incorporated. In order to provide these effects, the content of $K_2O$ in the glass of the present invention is preferably 0.5% or more, more preferably 1% or more, still more preferably 2% or more, particularly preferably 3% or more. On the other hand, if the content of $K_2O$ is too large, CS decreases. For this reason, the content of $K_2O$ is 10% or less, preferably 8% or less, more preferably 6% or less, still more preferably 4% or less, particularly preferably 2% or less.

MgO is a component stabilizing the glass, improving the meltability, and when being added to the glass, capable of reducing the content of alkali metal and suppressing increase in the coefficient of thermal expansion (CTE), and therefore may be incorporated. In order to provide these effects, the content of MgO in the glass of the present invention is preferably 2% or more, and more preferably, in a stepwise manner, 3% or more, 4% or more, 5% or more, 6% or more, 7% or more, or 8% or more. On the other hand, if the content of MgO exceeds 15%, the glass may be likely to be devitrified, causing a defect. The content of MgO is 15% or less, and preferably, in a stepwise manner, 14% or less, 13% or less, 12% or less, 11% or less, or 10% or less.

CaO is a component improving the crushability of the glass and also a component enhancing the meltability and may be incorporated. In the case of incorporating CaO, the content thereof is preferably 0.5% or more, more preferably 1% or more, still more preferably 2% or more, particularly preferably 3% or more. On the other hand, if the content of CaO exceeds 5%, the ion exchange performance may deteriorate. The content of CaO is 5% or less, preferably 3% or less, and more preferably 1% or less.

$ZrO_2$ is a component improving the crushability of the glass and also a component increasing the surface compressive stress by ion exchange and may be incorporated. In the case of incorporating $ZrO_2$, the content thereof is preferably 0.5% or more, more preferably 1% or more. On the other hand, if the content of $ZrO_2$ exceeds 5%, the glass may be likely to be devitrified, causing a defect. The content of $ZrO_2$ is 5% or less, preferably 4% or less, more preferably 2% or less, still more preferably 1.5% or less.

$B_2O_3$ is a component enhancing the chipping resistance and enhancing the meltability of the glass. $B_2O_3$ may be incorporated, and in the case of incorporating $B_2O_3$, the content thereof is preferably 0.5% or more, more preferably 1% or more, still more preferably 2% or more. On the other hand, when the content of $B_2O_3$ is 6% or less, striae can be prevented from being generated due to volatilization during melting and causing a defect. For this reason, the content of $B_2O_3$ is 6% or less, more preferably 5% or less, still more preferably 4% or less, particularly preferably 3% or less.

$P_2O_5$ is a component enhancing the ion exchange performance and chipping resistance. $P_2O_5$ may be incorporated, and in the case of incorporating $P_2O_5$, the content thereof is preferably 0.5% or more, more preferably 1% or more, still more preferably 2% or more. On the other hand, when the content of $P_2O_5$ is 5% or less, reduction in the crushability or acid resistance of the glass can be suppressed. The content of $P_2O_5$ is 5% or less, more preferably 4% or less, still more preferably 3% or less.

SrO is a component improving the crushability of the glass and also a component enhancing the meltability and may be incorporated. In the case of incorporating SrO, the content thereof is preferably 0.5% or more, more preferably 1% or more, still more preferably 2% or more, particularly preferably 3% or more, and most preferably 5% or more. In addition, when the content of SrO is 20% or less, reduction in the ion exchange performance can be suppressed. The content of SrO is more preferably 18% or less, still more preferably 16% or less, particularly preferably 14% or less, and most preferably 12% or less.

BaO is a component improving the crushability of the glass and also a component enhancing the meltability and may be incorporated. In the case of incorporating BaO, the content thereof is preferably 0.5% or more, more preferably 1% or more, still more preferably 2% or more, particularly preferably 3% or more, and most preferably 5% or more. On the other hand, when the content of BaO is 15% or less, reduction in the ion exchange performance can be suppressed. The content of BaO is more preferably 13% or less, still more preferably 11% or less, particularly preferably 9% or less, and most preferably 7% or less.

ZnO is a component enhancing the meltability of the glass and may be incorporated. In the case of incorporating ZnO, the content thereof is preferably 0.25% or more, more preferably 0.5% or more. On the other hand, when the content of ZnO is 10% or less, reduction in the weathering resistance of the glass can be suppressed. The content of ZnO is more preferably, in a stepwise manner, 7% or less, 5% or less, 4% or less, 3% or less, 2% or less, or 1% or less.

$TiO_2$ is a component improving the crushability of the glass and may be incorporated. In the case of incorporating $TiO_2$, the content thereof is preferably 0.1% or more, more preferably 0.15% or more, still more preferably 0.2% or more. On the other hand, when the content of $TiO_2$ is 5% or less, devitrification is suppressed and is less likely to cause a defect. The content of $TiO_2$ is preferably 3% or less, more preferably 2% or less, still more preferably 1% or less, particularly preferably 0.5% or less, and most preferably 0.25% or less.

$Y_2O_3$ is a component improving the crushability of the glass and may be incorporated. In the case of incorporating $Y_2O_3$, the content thereof is preferably 0.5% or more, more preferably 1% or more, still more preferably 1.5% or more, particularly preferably 2% or more, and most preferably 2.5% or more. On the other hand, when the content of $Y_2O_3$ is 5% or less, devitrification is less likely to occur and is prevented from causing a defect. The content of $Y_2O_3$ is 5% or less, more preferably 4% or less, still more preferably 3% or less.

$La_2O_3$ and $Nb_2O_5$ are components improving the crushability of the glass and may be incorporated. In the case of incorporating $La_2O_3$ and $Nb_2O_5$, the content of each component is preferably 0.5% or more, more preferably 1% or more, still more preferably 1.5% or more, particularly preferably 2% or more, and most preferably 2.5% or more. On the other hand, when the content of each of $La_2O_3$ and $Nb_2O_5$ is 8% or less, devitrification is less likely to occur and is prevented from causing a defect. The content of each of $La_2O_3$ and $Nb_2O_5$ is more preferably 6% or less, still more preferably 5% or less, particularly preferably 4% or less, and most preferably 3% or less.

Incidentally, the composition of the glass can be measured by a fluorescent X-ray method.

Other components that can be incorporated include, for example, $CeO_2$, $Fe_2O_3$, V (vanadium), Mn (manganese), Co (cobalt), Cu (copper), and Mo (molybdenum).

The glass for chemical strengthening used in the present production method has the above-described composition and it is sufficient if the glass has a composition capable of molding and strengthening by a chemical strengthening treatment. Specifically, examples thereof include aluminosilicate glass, soda lime glass, borosilicate glass, lead glass, alkali barium glass, and aluminoborosilicate glass.

The production method of the glass for chemical strengthening is not particularly limited. For example, the glass can be produced by charging predetermined glass raw materials into a continuous melting furnace, heating and melting the glass raw materials preferably at 1,500 to 1,600° C., and refining, and then, feeding the molten glass to a molding apparatus, subjecting the molten glass to molding in a sheet shape and annealing.

Incidentally, various methods can be used for the molding of the glass for chemical strengthening. For example, various molding methods such as downdraw process (e.g., overflow downdraw process, slot down process, redraw process), float process, rollout process and pressing process can be employed.

The thickness of the glass for chemical strengthening is not particularly limited, but in order to effectively perform the chemical strengthening treatment, the thickness is preferably 5 mm or less, more preferably 3 mm or less, still more preferably 1 mm or less, particularly preferably 0.85 mm or less.

The shape of the glass for chemical strengthening used in the present production method is not particularly limited. For example, various glass shapes such as a flat sheet shape having a uniform thickness, a shape in which at least one of the front surface and the back surface is a curved surface, and a three-dimensional shape having a bend portion or the like, can be employed. Incidentally, before the chemical strengthening treatment, the glass is preferably subjected to a shaping process appropriate for the intended use, for example, to mechanical processing such as cutting, end surface machining and drilling.

[Production Method of Chemically Strengthened Glass]

The chemical strengthening treatment in the present production method is performed by bringing a glass into contact with an inorganic salt composition, thereby replacing metal ions in the glass with metal ions in the inorganic salt composition having a larger ionic radius than the metal ions in the glass.

The method for bringing a glass into contact with an inorganic salt composition includes, for example, a method of applying a paste-like inorganic salt composition to a glass, a method of spraying an aqueous solution of an inorganic salt composition on a glass, and a method of immersing a glass in a salt bath of a molten salt of an inorganic salt composition heated to the melting point or more. Among these, for the reason that the production efficiency is enhanced, a method of immersing a glass in a molten salt of an inorganic salt composition is preferred.

The chemical strengthening treatment of immersing a glass in a molten salt of an inorganic salt composition can be conducted, for example, by the following procedure. First, a glass is preheated, and the molten salt is adjusted to a temperature at which chemical strengthening is performed. Next, the preheated glass is immersed in the molten salt for a predetermined period of time, and the glass is then drawn up from the molten salt and allowed to cool. The glass preheating temperature depends on the temperature at which the glass is immersed in a molten salt, but, in general, is preferably 100° C. or more.

The present production method is a production method for chemically strengthening a glass for chemical strengthening having the above-described composition and includes the following steps (1) to (3):

(1) a step of bringing the glass for chemical strengthening into contact with an inorganic salt composition containing 70 mass % or more of potassium nitrate to perform ion exchange, (2) a step of bringing the glass having been ion-exchanged in step (1) into contact with an inorganic salt composition containing 50 mass % or more of sodium nitrate to perform ion exchange, and (3) a step of bringing the glass having been ion-exchanged in step (2) into contact with an inorganic salt composition containing 70 mass % or more of potassium nitrate to perform ion exchange.

Each step is described below.

<Step (1)>

In step (1), a glass for chemical strengthening having the above-described composition is brought into contact with an inorganic salt composition containing 70 mass % or more of potassium nitrate. In step (1), metal ions (for example, Na ion) in the glass are ion-exchanged with metal ions (for example, K ion) in the inorganic salt composition having a larger ionic radius than the metal ions in the glass to form a high-density compressive stress layer in the glass surface layer part.

The content of potassium nitrate in the inorganic salt composition used in step (1) is more preferably 80 mass % or more, still more preferably 90 mass % or more, particularly preferably 100 mass %. When the content of potassium nitrate is 70 mass % or more, a high compressive stress value can be formed in the glass surface layer part.

The inorganic salt composition used in step (1) may be a composition composed of potassium nitrate or may contain other salts in addition to potassium nitrate. Examples of other salts include salts such as sodium nitrate, sodium carbonate, potassium carbonate, sodium chloride, potassium chloride, sodium borate, potassium borate, sodium sulfate and potassium sulfate, and one of these salts may be added alone, or a plurality thereof may be added in combination.

The contact temperature of the glass for chemical strengthening with the inorganic salt composition in step (1) is preferably 350° C. or more, more preferably 360° C. or more, still more preferably 370° C. or more. In addition, the contact temperature above is preferably 480° C. or less, more preferably 470° C. or less, still more preferably 460° C. or less. When the contact temperature is 350° C. or more, the ion exchange rate can be increased to shorten the chemical strengthening time. Furthermore, when the contact temperature is 480° C. or less, volatilization of the salt can be reduced.

The contact time of the glass for chemical strengthening with the inorganic salt composition in step (1) is preferably 0.5 hours or more, more preferably 1 hour or more, still more preferably 1.5 hours or more. In addition, the contact time is preferably 20 hours or less, more preferably 15 hours or less, still more preferably 12 hours or less, particularly preferably 6 hours or less. When the contact time is 0.5 hours or more, dispersion of the ion exchange level due to influence of fluctuations over time can be reduced. Furthermore, when the contact time is 20 hours or less, the production efficiency can be enhanced.

In order to bring the glass for chemical strengthening into contact with the inorganic salt composition in step (1), suitable contact conditions are, for example, at 350 to 480° C. and for 0.5 to 20 hours.

<Step (2)>

In step (2), the glass that has been ion-exchanged in step (1) is brought into contact with an inorganic salt composition containing 50 mass % or more of sodium nitrate. In step (2), metal ions (for example, Li ion) in the glass are ion-exchanged with metal ions (for example, Na ion) in the inorganic salt composition having a larger ionic radius than the metal ions in the glass to form a compressive stress layer introducing a compressive stress down to a position deeper than the surface layer part of step (1).

The content of sodium nitrate in the inorganic salt composition used in step (2) is preferably 65 mass % or more, more preferably 80 mass % or more, still more preferably 90 mass % or more, particularly preferably 100 mass %. When the content of sodium nitrate is 50 mass % or more, a relatively high compressive stress value can be formed in a deeper position from the glass surface.

The inorganic salt composition used in step (2) may be a composition composed of sodium nitrate or may contain other salts in addition to sodium nitrate. Examples of other salts include salts such as potassium nitrate, potassium carbonate, sodium carbonate, sodium chloride, potassium chloride, sodium borate, potassium borate, sodium sulfate and potassium sulfate, and one of these salts may be added alone, or a plurality thereof may be added in combination.

The contact temperature of the glass with the inorganic salt composition in step (2) is preferably 340° C. or more, more preferably 350° C. or more, still more preferably 360° C. or more. In addition, the contact temperature above is preferably 480° C. or less, more preferably 470° C. or less, still more preferably 460° C. or less. When the contact temperature is 340° C. or more, the ion exchange rate can be increased to shorten the chemical strengthening time. Furthermore, when the contact temperature is 480° C. or less, volatilization of the salt can be reduced.

The contact time of the glass with the inorganic salt composition in step (2) is preferably 0.5 hours or more, more preferably 1 hour or more, still more preferably 1.5 hours or more. In addition, the contact time is preferably 20 hours or less, more preferably 15 hours or less, still more preferably 12 hours or less, particularly preferably 6 hours or less. When the contact time is 0.5 hours or more, dispersion of the ion exchange level due to influence of fluctuations over time can be reduced. Furthermore, when the contact time is 20 hours or less, the production efficiency can be enhanced.

In order to bring the glass into contact with the inorganic salt composition in step (2), suitable contact conditions are, for example, at 340 to 480° C. and for 0.5 to 20 hours.

<Step (3)>

In step (3), the glass that has been ion-exchanged in step (2) is brought into contact with an inorganic salt composition containing 70 mass % or more of potassium nitrate. In step (3), metal ions (for example, Na ion) in the glass are ion-exchanged with metal ions (for example, K ion) in the inorganic salt composition having a larger ionic radius than the metal ions in the glass to form a high-density compressive stress layer in the glass surface, in addition to the compressive stress layers formed in step (1) and step (2).

The content of potassium nitrate in the inorganic salt composition used in step (3) is more preferably 80 mass % or more, still more preferably 90 mass % or more, particularly preferably 100 mass %. When the content of potassium nitrate is 70 mass % or more, a high compressive stress value can be formed on the glass surface.

The inorganic salt composition used in step (3) may be a composition composed of potassium nitrate or may contain other salts in addition to potassium nitrate. Examples of other salts include salts such as sodium nitrate, sodium carbonate, potassium carbonate, sodium chloride, potassium chloride, sodium borate, potassium borate, sodium sulfate and potassium sulfate, and one of these salts may be added alone, or a plurality thereof may be added in combination.

The contact temperature of the glass with the inorganic salt composition in step (3) is preferably 350° C. or more, more preferably 360° C. or more, still more preferably 370° C. or more. In addition, the contact temperature above is preferably 480° C. or less, more preferably 470° C. or less, still more preferably 460° C. or less. When the contact temperature is 350° C. or more, the ion exchange rate can be increased to shorten the chemical strengthening time. Furthermore, when the contact temperature is 480° C. or less, volatilization of the salt can be reduced.

The contact time of the glass with the inorganic salt composition in step (3) is preferably 0.5 hours or more, more preferably 1 hour or more, still more preferably 1.5 hours or more. In addition, the contact time is preferably 20 hours or less, more preferably 15 hours or less, still more preferably 12 hours or less, particularly preferably 6 hours or less, and most preferably 3 hours or less. When the contact time is 0.5 hours or more, dispersion of the ion exchange level due to influence of fluctuations over time can be reduced. Furthermore, when the contact time is 20 hours or less, the production efficiency can be enhanced.

In order to bring the glass for chemical strengthening into contact with the inorganic salt composition in step (3), suitable contact conditions are, for example, at 350 to 480° C. and for 0.5 to 20 hours.

The present production method preferably further includes a cleaning step of cleaning a glass sheet between respective steps of steps (1) to (3). In the cleaning step, industrial water, ion-exchanged water, etc. can be used. Among others, ion-exchanged water is preferably used. In addition, industrial water is preferably treated as appropriate and then used.

The cleaning conditions vary depending on the cleaning solution, but in the case of using ion-exchanged water, cleaning is preferably performed at a temperature of 0 to 100° C., because the salt deposited can be completely removed. In the cleaning step, various methods such as a method of immersing the glass in a water tank containing ion-exchanged water, etc., a method of exposing the glass surface to running water, and a method of spraying a cleaning solution toward the glass surface by a shower, can be used.

[Chemically Strengthened Glass]

(Glass Composition)

The chemically strengthened glass contains, in mole percentage based on oxides, from 50 to 80% of $SiO_2$, from 2 to 25% of $Al_2O_3$, from 0.1 to 20% of $Li_2O$, from 0.1 to 18% of $Na_2O$, from 0 to 10% of $K_2O$, from 0 to 15% of MgO, from 0 to 5% of CaO, from 0 to 5% of $P_2O_5$, from 0 to 6% of $B_2O_3$, from 0 to 5% of $Y_2O_3$, and from 0 to 5% of $ZrO_2$.

The composition of the chemically strengthened glass means the composition of the glass before chemical strengthening. More specifically, the portion having a tensile stress in the chemically strengthened glass has the same composition as that before chemical strengthening and therefore, the composition of the tensile stress portion in the chemically strengthened glass can be regarded as the matrix composition. Consequently, the composition of the chemically strengthened glass produced by the present production method is the same as the composition described in the section [Glass for Chemical Strengthening] described above.

Compressive Stress (CS):

In one embodiment of the chemically strengthened glass of the present invention, denoting t [mm] as the thickness of the glass, the compressive stress value at a depth of 20 [μm] from the surface is 160×t+12 [MPa] or more. In addition, denoting t [mm] as the thickness of the glass, the compressive stress value at a depth of 40 [μm] from the surface is 167×t−21 [MPa] or more, and the strength can be enhanced by making the compressive stress value high at a position of 20 μm to 40 μm from the glass surface.

In one embodiment of the chemically strengthened glass of the present invention, denoting t [mm] as the thickness of the glass, the average value of compressive stress at a depth of 20 to 40 [μm] from the surface is preferably 164×t-5 [MPa] or more. When the average value of compressive stress is 164×t-5 [MPa] or more, a deep compressive stress layer can be formed, and the strength can be enhanced by making the compressive stress value high at a position of 20 μm to 40 μm from the glass surface.

Depth of Compressive Stress Layer (DOL):

In one embodiment of the chemically strengthened glass of the present invention, the depth of compressive stress layer may be 60 μm or more and is preferably 70 μm or more, more preferably 80 μm or more. When the depth of compressive stress layer is 60 μm or more, the strength of the glass (sheet) can be enhanced.

The values CS and DOL can be measured by a surface stress meter. The surface stress meter includes, for example, FSM-6000 manufactured by Orihara Manufacturing Co., Ltd.

From the standpoint of realizing reduction in weight and thickness as a cover glass, the thickness of the chemically strengthened glass is preferably 1.1 mm or less, more preferably 0.9 mm or less, still more preferably 0.8 mm or less. In addition, the lower limit of the thickness is not particularly limited but, usually, is preferably 0.2 mm or more, more preferably 0.3 mm or more.

The chemically strengthened glass has a dimension capable of molding by an existing molding method and is finally cut into a size suitable for intended use. More specifically, the glass is cut into a size as large as, for example, a display of tablet PC, smartphone, etc., an automotive glass, or a window glass of building or housing. The chemically strengthened glass of the present invention is generally cut into a rectangular shape but may, without problem, be cut into a shape such as circular shape or polygonal shape and encompasses a perforated glass.

EXAMPLES

The present invention is specifically described below by referring to Examples, but the present invention is not limited thereto.

<Evaluation Methods>

Various evaluations in Examples were made by the following analysis methods.

(Compressive Stress Value)

The glass was subjected to measurements of the surface compressive stress value (unit: MPa), the compressive stress value (unit: MPa) at each depth, and the depth of compressive stress layer (DOL, unit: μm) by using a surface stress meter (FSM-6000) manufactured by Orihara Manufacturing Co., Ltd. and a scattered light photoelastic stress meter (SLP-1000) manufactured by Orihara Manufacturing Co., Ltd.

<Production of Glass for Chemical Strengthening>

As a glass for chemical strengthening, a glass sheet of 50 mm×50 mm×0.8 mm was prepared by using a glass having the following composition (in mole percentage based on oxides) produced by a float process.

Glass A: $SiO_2$ 70%, $Al_2O_3$ 7.5%, $Li_2O$ 8.0%, $Na_2O$ 5.3%, $K_2O$ 1.0%, MgO 7.0%, CaO 0.2% and $ZrO_2$ 1.0%; and Glass B: $SiO_2$ 64.1%, $Al_2O_3$ 15.5%, $Li_2O$ 6.3%, $Na_2O$ 10.7% and $P_2O_5$ 2.5%.

(Invention Example 1-1)

As step (1), a 0.8 mm-thick glass sheet having the composition of Glass A was immersed for 2 hours in a molten salt bath of an inorganic salt composition composed of 100 mass % of potassium nitrate kept at 450° C. Subsequently, the glass sheet was taken out of the bath, and the surface of the glass sheet was cleaned and dried.

Next, as step (2), the glass sheet after drying was immersed for 4 hours in a molten salt bath of an inorganic salt composition composed of 100 mass % of sodium nitrate kept at 450° C. Subsequently, the glass sheet was taken out of the bath, and the surface of the glass sheet was cleaned and dried.

Furthermore, as step (3), the glass sheet after drying was immersed for 1 hour in a molten salt bath of an inorganic salt composition composed of 100 mass % of potassium nitrate kept at 400° C. Subsequently, the glass sheet was taken out of the bath, and the surface of the glass sheet was cleaned and dried. Through these steps, the chemically strengthened glass of Invention Example 1-1 was manufactured.

(Invention Example 1-2 to Invention Example 4)

The chemically strengthened glasses of Invention Example 1-2 to Invention Example 4 were manufactured in the same manner as in Invention Example 1-1 except that with respect to a glass sheet having the glass composition A and the thickness shown in Table 1, the chemical strengthening steps were changed to respective conditions shown in Table 1.

(Comparative Examples 1 to 4)

The chemically strengthened glasses of Comparative Examples 1 to 4 were manufactured in the same manner as in Invention Example 1-1 except that with respect to a glass sheet having the glass composition A and the thickness shown in Table 1, the chemical strengthening steps were changed to respective conditions shown in Table 1. Incidentally, in Table 1, "-" in step (3) indicates that step (3) was not conducted.

With respect to the chemically strengthened glasses obtained above, various evaluations were performed. The treatment conditions of glass and the evaluation results are shown together in Table 1. In addition, "CS Depth 20 μm", "CS Depth 30 μm" and "CS Depth 40 μm" indicate respectively CS at depths of 20 μm, 30 μm and 40 μm from the surface, and "Average CS Depth 20-40 μm" indicates the average value of CS at a depth of 20 μm to 40 μm.

TABLE 1

| Example | Glass Material | | Chemical Strengthening Treatment | | | | | | | | |
|---|---|---|---|---|---|---|---|---|---|---|---|
| | | | Step (1) | | | Step (2) | | | Step (3) | | |
| | Kind | Thickness t (mm) | Inorganic Salt Composition | Temperature (° C.) | Time (hr) | Inorganic Salt Composition | Temperature (° C.) | Time (hr) | Inorganic Salt Composition | Temperature (° C.) | Time (hr) |
| Invention Ex. 1-1 | Glass A | 0.8 | $KNO_3$ 100 mass % | 450 | 2 | $KNO_3$ 100 mass % | 450 | 4 | $KNO_3$ 100 mass % | 400 | 1 |
| Invention Ex. 1-2 | Glass A | 0.8 | $KNO_3$ 100 mass % | 450 | 8 | $KNO_3$ 100 mass % | 450 | 4 | $KNO_3$ 100 mass % | 400 | 1 |
| Invention Ex. 1-3 | Glass A | 0.8 | $KNO_3$ 100 mass % | 430 | 2 | $KNO_3$ 100 mass % | 430 | 6 | $KNO_3$ 100 mass % | 400 | 1 |
| Comp. Ex. 1 | Glass A | 0.8 | $KNO_3$ 100 mass % | 450 | 2 | $KNO_3$ 100 mass % | 425 | 1.5 | | — | |
| Invention Ex. 2 | Glass A | 0.7 | $KNO_3$ 100 mass % | 450 | 2 | $KNO_3$ 100 mass % | 450 | 4 | $KNO_3$ 100 mass % | 400 | 1 |
| Comp. Ex. 2 | Glass A | 0.7 | $KNO_3$ 100 mass % | 450 | 2.5 | $KNO_3$ 100 mass % | 425 | 1.5 | | — | |
| Invention Ex. 3 | Glass A | 0.6 | $KNO_3$ 100 mass % | 450 | 2 | $KNO_3$ 100 mass % | 450 | 4 | $KNO_3$ 100 mass % | 400 | 1 |
| Comp. Ex. 3 | Glass A | 0.6 | $KNO_3$ 100 mass % | 450 | 1.5 | $KNO_3$ 100 mass % | 425 | 1.5 | | — | |
| Invention Ex. 4 | Glass A | 0.5 | $KNO_3$ 100 mass % | 450 | 2 | $KNO_3$ 100 mass % | 450 | 4 | $KNO_3$ 100 mass % | 400 | 1 |
| Comp. Ex. 4 | Glass A | 0.5 | $KNO_3$ 100 mass % | 450 | 1.5 | $KNO_3$ 100 mass % | 425 | 1.5 | | — | |

| Example | CS (MPa) | DOL (μm) | CS Depth 20 μm (MPa) | CS Depth 30 μm (MPa) | CS Depth 40 μm (MPa) | Average CS Depth 20-40 μm (MPa) | 160 × t + 12 (MPa) | 167 × t − 21 (MPa) | 164 × t − 5 (MPa) |
|---|---|---|---|---|---|---|---|---|---|
| Invention Ex. 1-1 | 737 | 142 | 171 | 141 | 133 | 152 | 140 | 113 | 126 |
| Invention Ex. 1-2 | 664 | 128 | 152 | 132 | 113 | 132 | | | |
| Invention Ex. 1-3 | 704 | 148 | 190 | 151 | 147 | 158 | | | |
| Comp. Ex. 1 | 900 | 151 | 134 | 121 | 108 | 121 | | | |
| Invention Ex. 2 | 700 | 127 | 140 | 127 | 110 | 125 | 124 | 96 | 110 |
| Comp. Ex. 2 | 903 | 136 | 120 | 107 | 94 | 107 | | | |
| Invention Ex. 3 | 683 | 105 | 125 | 110 | 101 | 113 | 108 | 79 | 93 |
| Comp. Ex. 3 | 918 | 114 | 105 | 91.2 | 78 | 91 | | | |
| Invention Ex. 4 | 670 | 93 | 105 | 95 | 87 | 96 | 92 | 63 | 77 |
| Comp. Ex. 4 | 865 | 103 | 87 | 74 | 62 | 74 | | | |

As shown in Table 1, in the chemically strengthened glasses of Invention Examples 1-1 to 1-3, compared with the chemically strengthened glass of Comparative Example 1, CS at depths of 20 μm, 30 μm and 40 μm from the surface were high and the average value of CS at a depth of 20 to 40 μm from the surface was high. In addition, the same results were obtained when the chemically strengthened glasses of Invention Examples 2 to 4 which were changed in the thickness were compared to the chemically strengthened glasses of Comparative Examples 2 to 4, respectively.

(Invention Example 5-1)

As step (1), a 0.8 mm-thick glass sheet having the composition of Glass B was immersed for 2 hours in a molten salt bath of an inorganic salt composition composed of 100 mass % of potassium nitrate kept at 450° C. Subsequently, the glass sheet was taken out of the bath, and the surface of the glass sheet was cleaned and dried.

Next, as step (2), the glass sheet after drying was immersed for 4 hours in a molten salt bath of an inorganic salt composition composed of 100 mass % of sodium nitrate kept at 450° C. Subsequently, the glass sheet was taken out of the bath, and the surface of the glass sheet was cleaned and dried.

Furthermore, as step (3), the glass sheet after drying was immersed for 1 hour in a molten salt bath of an inorganic salt composition composed of 100 mass % of potassium nitrate kept at 400° C. Subsequently, the glass sheet was taken out of the bath, and the surface of the glass sheet was cleaned and dried. Through these steps, the chemically strengthened glass of Invention Example 5-1 was manufactured.

(Invention Example 5-2 to Invention Example 7-2)

The chemically strengthened glasses of Invention Example 5-2 to Invention Example 7-2 were manufactured in the same manner as in Invention Example 5-1 except that with respect to a glass sheet having the glass composition B and the thickness shown in Table 2, the chemical strengthening steps were changed to respective conditions shown in Table 2.

(Comparative Examples 5 to 7)

The chemically strengthened glasses of Comparative Examples 5 to 7 were manufactured in the same manner as in Invention Example 5-1 except that with respect to a glass sheet having the glass composition B and the thickness shown in Table 2, the chemical strengthening steps were changed to respective conditions shown in Table 2. Incidentally, in Table 2, "-" in step (3) indicates that step (3) was not conducted.

With respect to the chemically strengthened glasses obtained above, various evaluations were performed. The treatment conditions of glass and the evaluation results are shown together in Table 2. In addition, "CS Depth 20 μm", "CS Depth 30 μm" and "CS Depth 40 μm" indicate respectively CS at depths of 20 μm, 30 μm and 40 μm from the surface, and "Average CS Depth 20-40 μm" indicates the average value of CS at a depth of 20 μm to 40 μm.

As shown in Table 2, in the chemically strengthened glasses of Invention Examples 5-1 and 5-2, compared with the chemically strengthened glass of Comparative Example 5, CS at depths of 20 μm, 30 μm and 40 μm from the surface were high and the average value of CS at a depth of 20 to 40 μm from the surface was high. In addition, the same results were obtained when the chemically strengthened glasses of Invention Examples 6-1 and 6-2 and Invention Examples 7-1 and 7-2 which were changed in the thickness were compared to the chemically strengthened glasses of Comparative Example 6 and Comparative Example 7, respectively.

As understood from these results, when the production method of the present invention was employed, a high compressive stress compared with conventional ones could be realized in a region where the depth from the surface is relatively shallow, and a chemically strengthened glass having excellent strength was obtained.

TABLE 2

| | Glass Material | | Chemical Strengthening Treatment | | | | | | | | |
|---|---|---|---|---|---|---|---|---|---|---|---|
| | | | Step (1) | | | Step (2) | | | Step (3) | | |
| Example | Kind | Thickness t (mm) | Inorganic Salt Composition | Temperature (° C.) | Time (hr) | Inorganic Salt Composition | Temperature (° C.) | Time (hr) | Inorganic Salt Composition | Temperature (° C.) | Time (hr) |
| Invention Ex. 5-1 | Glass B | 0.8 | $KNO_3$ 100 mass % | 450 | 2 | $KNO_3$ 100 mass % | 450 | 4 | $KNO_3$ 100 mass % | 400 | 1 |
| Invention Ex. 5-2 | Glass B | 0.8 | $KNO_3$ 100 mass % | 450 | 2 | $KNO_3$ 100 mass % | 380 | 4 | $KNO_3$ 100 mass % | 380 | 0.7 |
| Comp. Ex. 5 | Glass B | 0.8 | $NaNO_3$ 30 mass % $KNO_3$ 70 mass % | 380 | 4 | $KNO_3$ 95 mass % $NaNO_3$ 5 mass % | 380 | 0.7 | — | | |
| Invention Ex. 6-1 | Glass B | 0.7 | $KNO_3$ 100 mass % | 450 | 2 | $KNO_3$ 100 mass % | 450 | 4 | $KNO_3$ 100 mass % | 400 | 1 |
| Invention Ex. 6-2 | Glass B | 0.7 | $KNO_3$ 100 mass % | 450 | 2 | $KNO_3$ 100 mass % | 380 | 4 | $KNO_3$ 100 mass % | 380 | 0.7 |
| Comp. Ex. 6 | Glass B | 0.7 | $NaNO_3$ 30 mass % $KNO_3$ 70 mass % | 380 | 4 | $KNO_3$ 95 mass % $NaNO_3$ 5 mass % | 380 | 0.7 | — | | |
| Invention Ex. 7-1 | Glass B | 0.5 | $KNO_3$ 100 mass % | 450 | 2 | $KNO_3$ 100 mass % | 450 | 4 | $KNO_3$ 100 mass % | 400 | 1 |
| Invention Ex. 7-2 | Glass B | 0.5 | $KNO_3$ 100 mass % | 450 | 2 | $KNO_3$ 100 mass % | 380 | 4 | $KNO_3$ 100 mass % | 380 | 0.7 |
| Comp. Ex. 7 | Glass B | 0.5 | $NaNO_3$ 30 mass % $KNO_3$ 70 mass % | 380 | 4 | $KNO_3$ 95 mass % $NaNO_3$ 5 mass % | 380 | 0.7 | — | | |

| Example | CS (MPa) | DOL (μm) | CS Depth 20 μm (MPa) | CS Depth 30 μm (MPa) | CS Depth 40 μm (MPa) | Average CS Depth 20-40 μm (MPa) | 160 × t + 12 (MPa) | 167 × t − 21 (MPa) | 164 × t − 5 (MPa) |
|---|---|---|---|---|---|---|---|---|---|
| Invention Ex. 5-1 | 780 | 135 | 151 | 140 | 127 | 139 | 140 | 113 | 126 |
| Invention Ex. 5-2 | 850 | 121 | 140 | 130 | 120 | 130 | | | |
| Comp. Ex. 5 | 946 | 143 | 132 | 119 | 106 | 119 | | | |
| Invention Ex. 6-1 | 699 | 118 | 133 | 120 | 110 | 121 | 124 | 96 | 110 |
| Invention Ex. 6-2 | 772 | 115 | 130 | 110 | 105 | 113 | | | |
| Comp. Ex. 6 | 855 | 125 | 113 | 101 | 89 | 101 | | | |
| Invention Ex. 7-1 | 757 | 101 | 130 | 110 | 92 | 91 | 92 | 63 | 77 |
| Invention Ex. 7-2 | 878 | 97 | 107 | 90 | 75 | 91 | | | |
| Comp. Ex. 7 | 826 | 87 | 82 | 66 | 51 | 66 | | | |

The present application is based on Japanese Patent Application (No. 2018-007380) filed on Jan. 19, 2018, and the entirety of which is incorporated by reference.

INDUSTRIAL APPLICABILITY

According to the production method of the present invention, a high compressive stress compared with conventional ones can be achieved in a region where the depth from the surface is relatively shallow, and a chemically strengthened glass having excellent strength can be produced. The chemically strengthened glass of the present invention is usable as a cover glass for displays such as mobile phone, digital camera and touch panel display.

What is claimed is:

1. A chemically strengthened glass having a thickness of 0.2 mm to 1.1 mm, a surface compressive stress value of 664 MPa or more, having a depth of a compressive stress layer of 60 μm or more, and comprising, in mole percentage based on oxides, from 50 to 80% of $SiO_2$, from 2 to 25% of $Al_2O_3$, from 0.1 to 20% of $Li_2O$, from 0.1 to 18% of $Na_2O$, from 0 to 10% of $K_2O$, from 0 to 15% of MgO, from 0 to 5% of CaO, from 0 to 5% of $P_2O_5$, from 0 to 6% of $B_2O_3$, from 0 to 5% of $Y_2O_3$, and from 0 to 5% of $ZrO_2$, wherein, the glass has a compressive stress value at a depth of 20 [μm] from a surface of the glass of 160×t+12 [MPa] or more, and a compressive stress value at a depth of 40 [μm] from the surface of the glass of 167×t−21 [MPa] or more, wherein t is a thickness [mm] of the glass.

2. A chemically strengthened glass, having a thickness of 0.2 mm to 1.1 mm, a surface compressive stress value of 664 MPa or more, having a depth of a compressive stress layer of 60 μm or more, and comprising, in mole percentage based on oxides, from 50 to 80% of $SiO_2$, from 2 to 25% of $Al_2O_3$, from 0.1 to 20% of $Li_2O$, from 0.1 to 18% of $Na_2O$, from 0 to 10% of $K_2O$, from 0 to 15% of MgO, from 0 to 5% of CaO, from 0 to 5% of $P_2O_5$, from 0 to 6% of $B_2O_3$, from 0 to 5% of $Y_2O_3$, and from 0 to 5% of $ZrO_2$, wherein, the glass has an average value of a compressive stress at a depth of 20 to 40 [μm] from a surface of the glass of 164×t-5 [MPa] or more, wherein t is a thickness [mm] of the glass.

* * * * *